(12) United States Patent
Fujisawa

(10) Patent No.: US 8,325,375 B2
(45) Date of Patent: Dec. 4, 2012

(54) CHANGING A THRESHOLD VALUE OF AN AMOUNT OF DATA TO BE STORE IN A STORAGE DEVICE

(75) Inventor: Minoru Fujisawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 932 days.

(21) Appl. No.: 12/405,879

(22) Filed: Mar. 17, 2009

(65) Prior Publication Data
US 2009/0237726 A1 Sep. 24, 2009

(30) Foreign Application Priority Data
Mar. 18, 2008 (JP) .................................. 2008-069968

(51) Int. Cl.
*G06K 15/00* (2006.01)
(52) U.S. Cl. ....................................................... 358/1.16
(58) Field of Classification Search .................. 358/1.16
See application file for complete search history.

(56) References Cited

FOREIGN PATENT DOCUMENTS
| JP | 11-25007 A | 1/1999 |
|---|---|---|
| JP | 2006-119786 A | 5/2006 |

*Primary Examiner* — Marivelisse Santiago Cordero
*Assistant Examiner* — Eric A Rust
(74) *Attorney, Agent, or Firm* — Canon USA Inc. IP Division

(57) ABSTRACT

An image forming apparatus including an acquisition unit configured to acquire log data recording operation of the image forming apparatus, a first storage unit configured to store the acquired log data in a volatile memory, a calculation unit configured to calculate a total size of the log data stored in the volatile memory, a determination unit configured to determine whether the calculated total size of the log data has reached a threshold value, a second storage unit configured to store the log data from the first storage unit when the total size of the log data in the first storage unit has reached the threshold value, and a changing unit configured to change the threshold value according to an operation state of the image forming apparatus.

12 Claims, 14 Drawing Sheets

FIG.7

| 701 | 702 | 703 | 704 | 705 | 706 |
|---|---|---|---|---|---|
| AREA | ACCESS STATE | CURRENT STORED DATA SIZE | READING START POSITION | WRITING START POSITION | STORAGE START SIZE IN NONVOLATILE MEMORY |
| AREA A | WRITING | 4 MB | READING START ADDRESS | WRITING START ADDRESS | 4 MB |
| AREA B | READ | 8MB | READING START ADDRESS | WRITING START ADDRESS | |

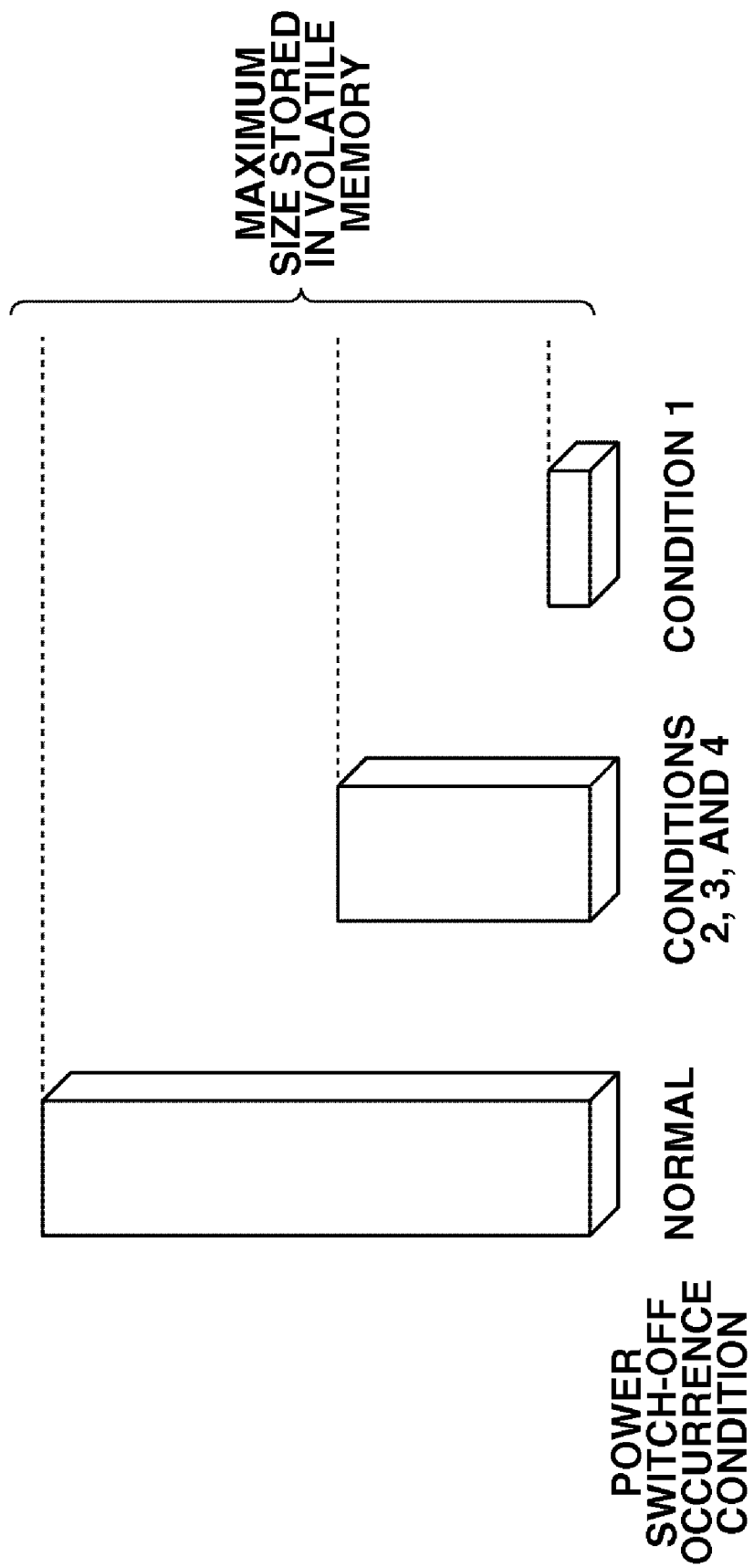

CHANGING A THRESHOLD VALUE OF AN AMOUNT OF DATA TO BE STORE IN A STORAGE DEVICE

BACKGROUND OF THE INVENTION

1. Field of the Invention

The present invention relates to an image forming apparatus for forming an image, its operation recording method, and a storage medium.

2. Description of the Related Art

A method for investigating a cause of a failure in a network communication device by collecting packets flowing through a network communication path is generally known. According to the general method, a device dedicated to packet acquisition is connected to a line concentrator, and a manager of the communication device collects packets flowing through a local area network (LAN) by using this dedicated device.

The manager analyzes, among the collected packets, the data of a packet transmitted/received by the network communication device, which is the investigation target. As a result of the analysis, the manager identifies a place which has received unprescribed data or a place where a delay of response to a received packet has occurred. To determine whether such a place is a cause of the failure, the manager carries out cause investigation such as transmission of the same packet to the network device to reproduce and confirm the failure, or conducts analysis of a source code responsible for communication of the network device.

A network communication device having a packet acquisition function has recently become popular. This function enables acquisition of a packet without using any device dedicated to packet collection. Thus, even when correct packet collection cannot be carried out even if a dedicated device is connected, for example, in an environment where a switching hub has been introduced, packets can be collected. As a result, packet collection has generally been used when a failure of a communication device occurs or packet information investigation is performed.

The log data of an obtained network packet is stored in a nonvolatile memory such as a magnetic disk so that the stored log data can be acquired when the log information is investigated at a later date. Thus, the manager can check what data have been processed in what order when the failure occurs, at a later date. In this case, the log data records contents of a performed operation, transmitted/received data, or a date and time when the operation or data transmission/reception is carried out.

Such technique is important because it enables a user of the device to receive a quick description and appropriate countermeasures when a device failure occurs.

In order to analyze the failure, checking of the following information from the log data is more important than checking the log data when the device normally operates: information indicating what data have been processed in what order and with what size and frequency just before/after occurrence of a device failure or a performance reduction.

Further, it is important to check a processing speed or a flow rate of data relating to the device for a fixed time, or investigate how often the device is accessed by the data such as a packet that is not directly associated with the device.

It is important in the function of storing the log data such as a network packet that "necessary data are correctly stored in correct order with correct sizes, at timing just before/after occurrence of a failure or at timing desirable for acquisition of log data". It is publicly known that an access speed of a volatile memory is faster than that of a nonvolatile memory.

Thus, in view of improvement of processing performance and a life of the nonvolatile memory dependent on an upper limit of a number of accessing times to the nonvolatile memory, when the data is stored in the nonvolatile memory, storing the data first in the volatile memory and then storing the data in the nonvolatile memory may be employed.

A possible problem in the case of storing the log data in the nonvolatile memory by using this method is that a user may turn off power of the device while the log data is being acquired and stored in the nonvolatile memory. If that happens, the log data stored in the volatile memory is lost.

The lost data is no longer stored in the nonvolatile memory. Consequently, the object of "correctly storing the log data necessary for failure analysis, just before/after occurrence of the failure of the device or at the time of a performance reduction" cannot be achieved. This means a possible loss of the important log data that is to be an investigation target.

A method has recently been employed which maintains a conductive state of the device for a certain time after receiving a power cutoff signal by using an auxiliary battery or a charge memory at the time of power cutoff and storing the data held in the volatile memory in the nonvolatile memory while maintaining the conductive state. Japanese Patent Application Laid-Open No. 11-25007 discusses use of a random access memory (RAM) backed-up by a battery, which is triggered by NMI interruption of a central processing unit (CPU) at the time of power cutoff of the device. Thus, the stored data of the RAM is saved by keeping the RAM in the conductive state for a certain time to prevent a data loss of the volatile memory.

However, in the above example, cost of preventing the data loss of the volatile memory is very high. Thus, when the log data storing function is used only for investigation, the cost should preferably be kept as low as possible.

SUMMARY OF THE INVENTION

According to an aspect of the present invention, an image forming apparatus includes an acquisition unit configured to acquire log data recording operation of the image forming apparatus. The image forming apparatus also includes a first storage unit configured to store the acquired log data in a volatile memory, a calculation unit configured to calculate a total size of the log data stored in the volatile memory, a determination unit configured to determine whether the calculated total size of the log data has reached a threshold value. A second storage unit is also provided. The second storage unit is configured to store the log data from the first storage unit when the total size of the log data has reached the threshold value. The second storage unit is configured to store the log data from the first storage unit in a nonvolatile memory. The image forming apparatus also includes a changing unit configured to change the threshold value according to an operation state of the image forming apparatus.

According to another aspect of the present invention, a method for recording operation of an image forming apparatus includes acquiring log data recording the operation of the image forming apparatus, storing the acquired log data in a volatile memory, calculating a total size of the log data stored in the volatile memory, determining whether the calculated total size of the log data has reached a threshold value. The method continues with storing the log data from the volatile memory in a nonvolatile memory when the total size of the log data in the volatile memory has reached the threshold value. The method may conclude by changing the threshold value according to an operation state of the image forming apparatus.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7 illustrates an access state information table regarding areas A and B in a volatile memory.

FIG. 14 illustrates a status where storage start sizes (threshold values) in a nonvolatile memory are set to different values according to conditions.

DETAILED DESCRIPTION OF THE EMBODIMENTS

Various exemplary embodiments, features, and aspects of the invention will be described in detail below with reference to the drawings.

An image forming apparatus of an exemplary embodiment of the present invention is applied to a multifunction peripheral (MFP) which has a network communication function.

Figure 1:
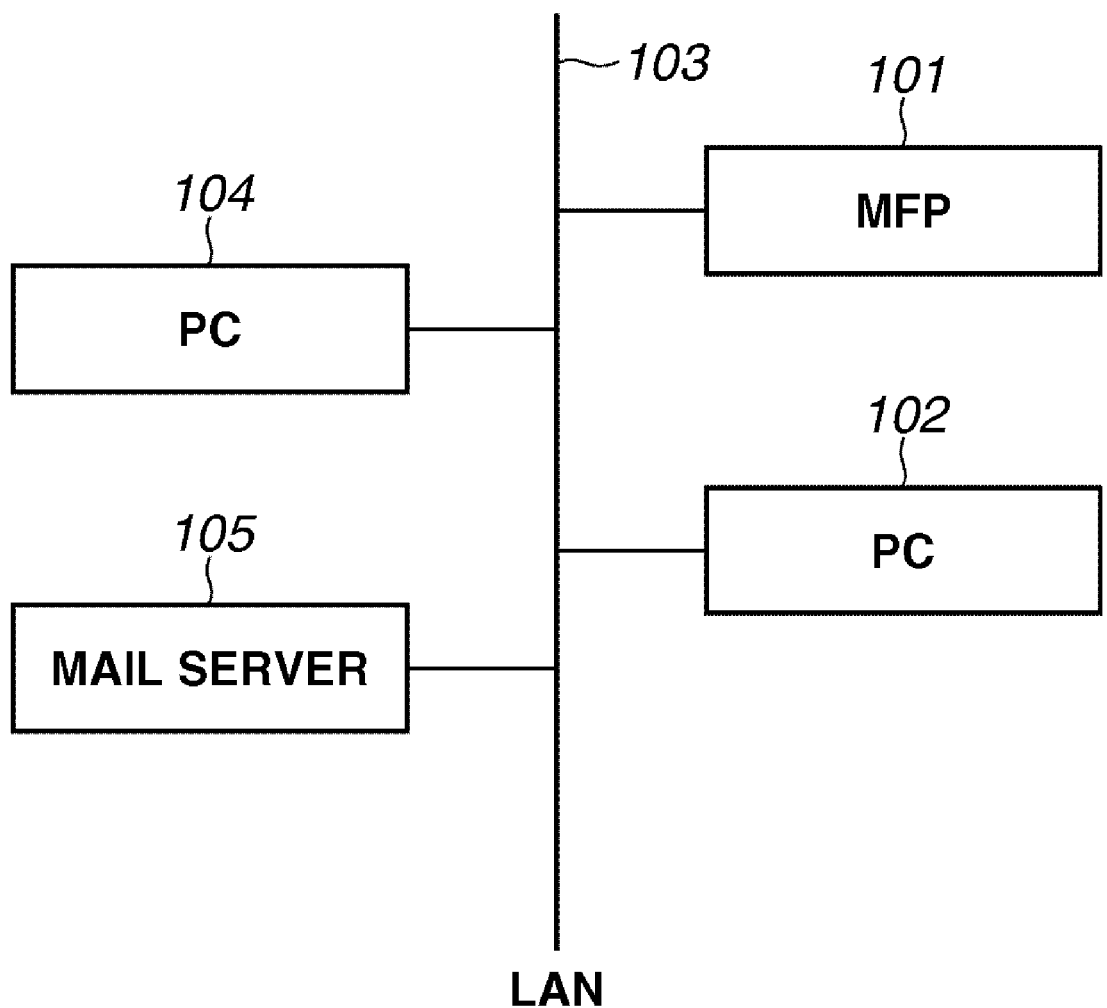
FIG. 1 illustrates a configuration of a network system to which a multifunction peripheral (MFP) is connected according to a first exemplary embodiment of the present invention.

FIG. 1 illustrates a configuration of a network system to which an MFP is connected according to a first exemplary embodiment of the present invention. In the network system, a plurality of nodes having network interfaces is connected to a LAN 103.

The LAN 103 is a network in a user environment, and its LAN standard is Ethernet (registered trademark). An MFP 101, two personal computers (PCs) 102 and 104, and a mail server 105 are provided as nodes in the exemplary embodiment and connected to the LAN 103. However, a configuration of device connected to the network system is not limited to this embodiment.

A configuration of the MFP 101 will be described below. The PCs 102 and 104 are general-purpose personal computers. Each of the PCs 102 and 104 includes a central processing unit (CPU), a RAM, a read-only memory (ROM) and a hard disk drive (HDD) which are storage devices, a CD-ROM drive which is an external storage device, a network interface card (NIC) which is an external interface, a universal serial bus (USB) which is a host interface, and a bus for controlling these devices and peripheral devices described below.

The peripheral devices connected to a personal computer main body includes a mouse, a cathode ray tube (CRT) display, and a keyboard by way of example. The PC 102 includes pieces of office software such as an operating system (OS), a word processor, and spreadsheet software. The OS includes a port monitor as one of its functions for transmitting print data to a printer or the MFP via a network. The OS further includes a mailer for electronic mail transmission/reception, i.e., transmitting or receiving electronic mail to/from a mail server 105 described below.

The mail server 105 is an electronic mail server which transmits or receives electronic mail by using a transfer protocol such as a simple mail transfer protocol (SMTP) or a post office protocol version 3 (POP 3). The mail server 105 has electronic mail accounts set for the MFP 101, the PC 102, and the PC 104. Each of these nodes can transmit electronic mail via the mail server 105.

Figure 2:
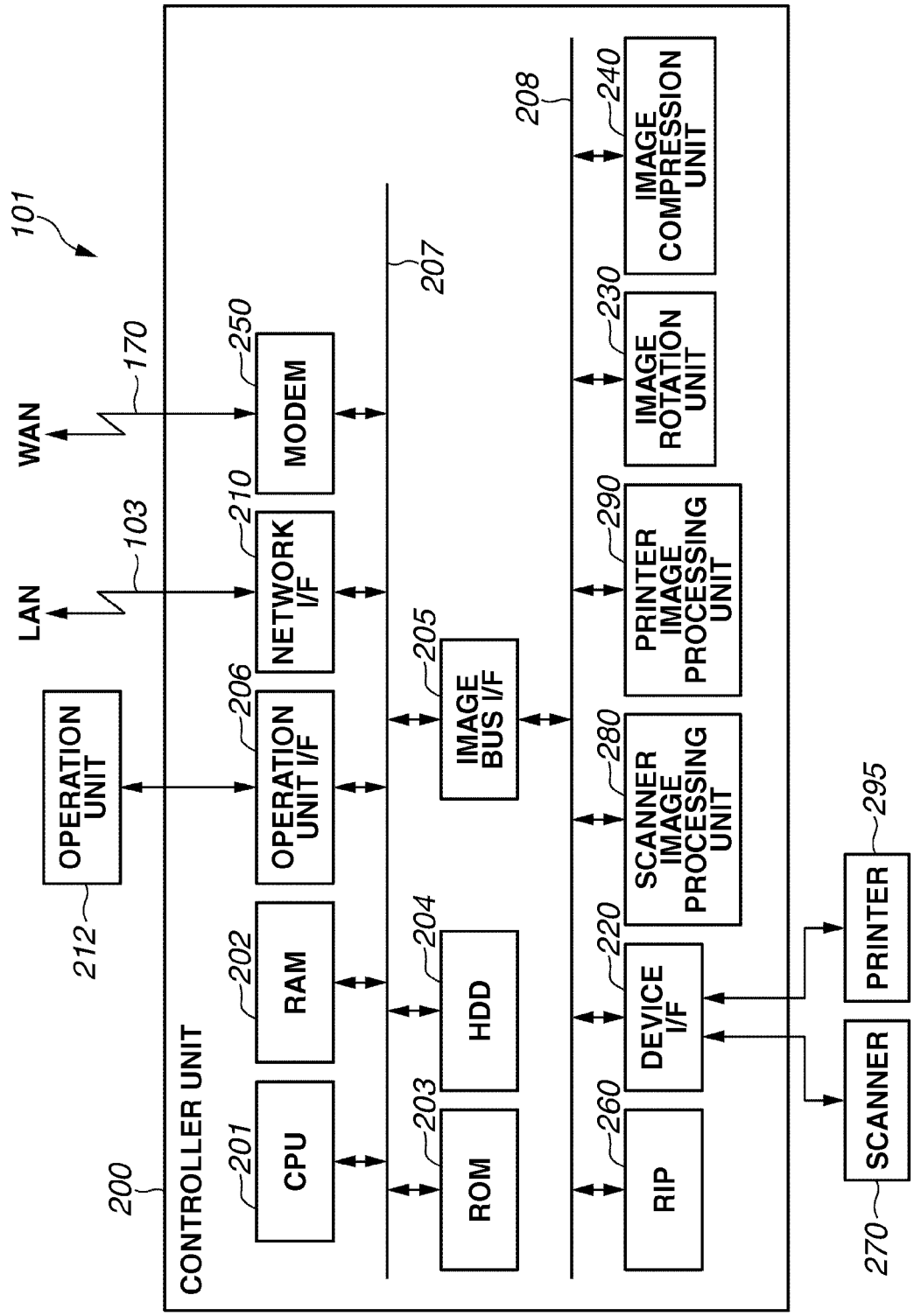
FIG. 2 is a block diagram illustrating a configuration of a main portion of a controller unit of the MFP.

FIG. 2 is a block diagram illustrating a configuration of a main portion of a controller unit of the MFP 101. The MFP 101 includes a scanner 270, a printer 295, a controller unit 200, and an operation unit 212. The controller unit 200 is connected to the scanner 270 which is an image input device and the printer 295 which is an image output device, and performs control to realize a copy function of printing image data read by the scanner 270 with the printer 295. The controller unit 200 is connected to the LAN 103, and performs control to enter or output image information or device information.

More specifically, in the controller unit 200, a CPU 201, a RAM 202, a ROM 203, a HDD 204, an image bus interface (I/F) 205, an operation unit I/F 206, a network I/F 210, and a modem 250 are connected to a system bus 207. In the controller unit 200, a raster image processor (RIP) 260, a device I/F 220, a scanner image processing unit 280, a printer image processing unit 290, an image rotation unit 230, and an image compression unit 240 are connected to an image bus 208.

The CPU 201 starts the operating system (OS) with a boot program stored in the ROM 203. The CPU 201 performs various processes by executing on the OS an application program stored in the HDD 204. The CPU 201 uses the RAM 202 as its work area. The RAM 202 serves as, in addition to the work area, an image memory area for temporarily storing image data. The RAM 202 is also used as a volatile memory 404 described below. The HDD 204 stores image data in addition to the application program. The HDD 204 is also used as a nonvolatile memory 405 described below.

As described above, the operation unit I/F 206, the network I/F 210, the modem 250, and the image bus I/F 205 are connected to the CPU 201 via the system bus 207. The operation unit I/F 206 is an interface with the operation unit 212 which includes a touch panel, and outputs image data displayed on the operation unit 212 to the operation unit 212. The operation unit I/F 206 sends information entered from the operation unit 212 by a user to the CPU 201.

The network I/F 210 is connected to the LAN 103 to receive or output, via the LAN 103, information from and to the devices on the LAN 103. The modem 250 is connected to a public line to enter or output information. The image bus I/F 205 is a bus bridge connected to the system bus 207 and the image bus 208 may be used for transferring image data at a high speed to convert a data structure.

The image bus 208 includes a PCI bus or IEEE 1394. As described above, the RIP 260, the device I/F 220, the scanner image processing unit 280, the printer image processing unit 290, the image rotation unit 230, and the image compression unit 240 are connected to the image bus 208.

The RIP 260 is a processor for rasterizing a PDL code into a bitmap image. The scanner 270 and the printer 295 are connected to the device I/F 220. The device I/F 220 performs synchronous/asynchronous conversion for image data. The scanner image processing unit 280 corrects, processes and edits entered image data. The printer image processing unit 290 performs printer correction or resolution conversion for print output image data. The image rotation unit 230 rotates the image data. The image compression unit 240 compresses multivalued image data into JPEG data or binary image data into data of JBIG, MMR or MH, and decompresses the data.

Figure 3:
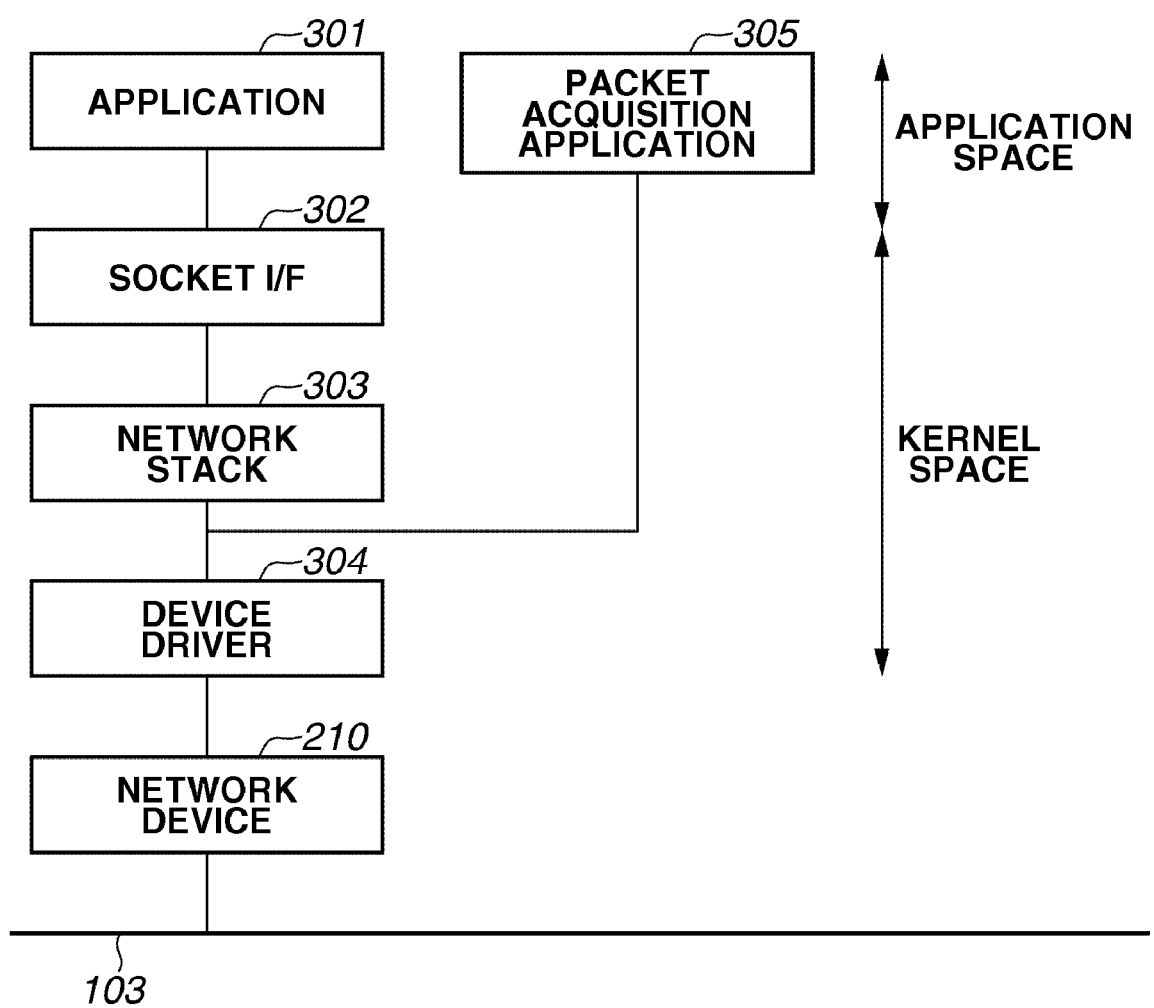
FIG. 3 illustrates a configuration of software concerning a main portion of the MFP.

FIG. 3 illustrates a configuration of software concerning a main portion of the MFP 101 according to the exemplary embodiment. The MFP 101 includes a general-purpose operating system (OS) such as Linux. An application 301 is a set of network applications operated on the MFP 101. A socket I/F 302 is a socket I/F program provided by the OS.

When the network application included in the application 301 performs communication, the socket I/F 302 is loaded to enable processing such as transmission or reception of data. The socket I/F 302 is not a program always necessary when the network application performs communication. However, the socket I/F 302 can use a general-purpose program command and a processing flow irrespective of a type of an OS, enabling a reduction in a number of application development steps. Thus, the network application generally loads the socket I/F 302 to perform data transmission or reception.

A network stack 303 is a group of protocol stacks. A network driver 304 is a device driver for the network I/F 210. A packet acquisition application 305 acquires a network packet transmitted/received by the network I/F 210 or outputs a log. The packet acquisition application 305 acquires data from the device driver 304 to obtain all packets received or transmitted by the network I/F 210.

Detailed processing contents of the packet acquisition application 305 and a configuration of hardware used for the application will be described below referring to FIG. 4. The application 301 and the packet acquisition application 305 operate in an application space, while the socket I/F 302, the network stack 303, and the device driver 304 operate in a kernel space.

Figure 4:
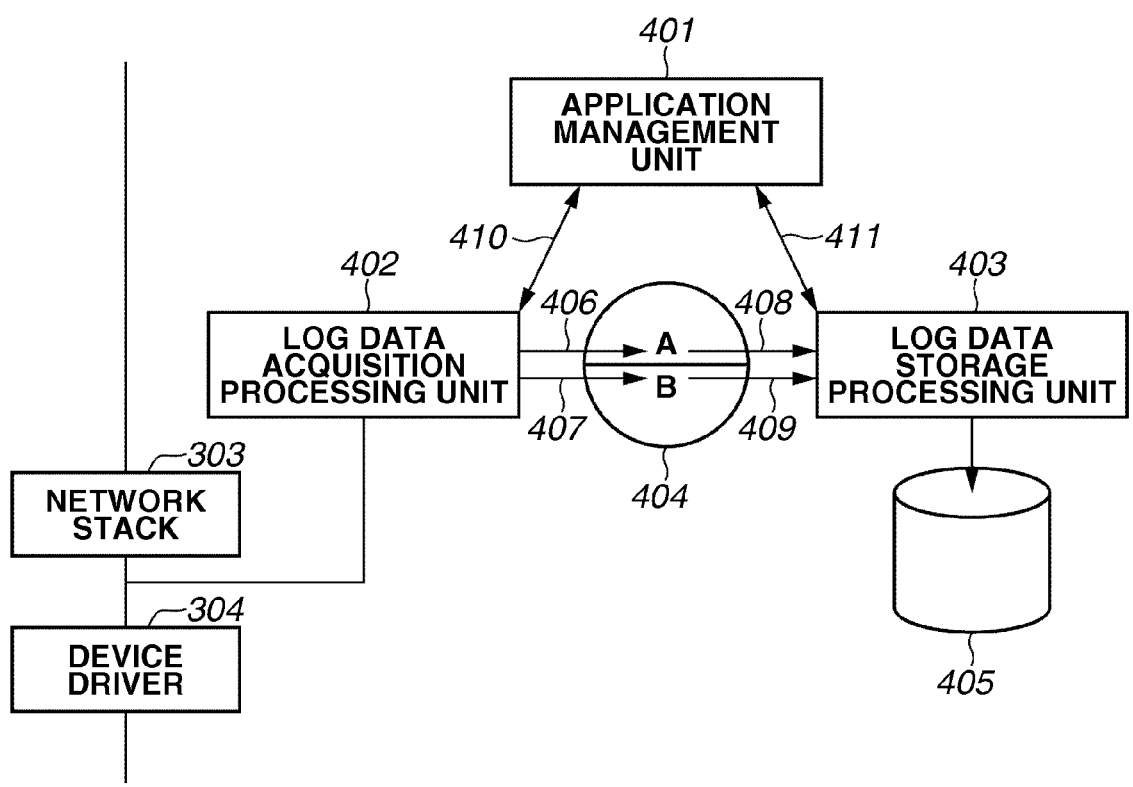
FIG. 4 is a block diagram illustrating detailed processing of a packet acquisition application and a configuration of hardware used for the application.

FIG. 4 is a block diagram illustrating detailed processing of the packet acquisition application 305 and a configuration of used hardware. The image forming apparatus has a packet capturing function of acquiring a packet transmitted/received via the network, and processes the acquired (captured) packet as log data containing communication contents recorded therein as operation contents of the apparatus. The packet acquisition application 305 is stored in the ROM 203 of the controller unit 200, and executed by the CPU 201 to realize functions of an application management unit 401, a log data acquisition processing unit 402, and a log data storage processing unit 403.

The application management unit 401 manages a starting state of each task, a processing state, and a stored data size and a storing position of the volatile memory. The log data acquisition processing unit 402 and the log data storage processing unit 403 manage information indicating whether the area A or area B of the volatile memory 404 has been accessed. The log data acquisition processing unit 402 and the log data storage processing unit 403 perform communication with other tasks or other applications.

The log data acquisition processing unit 402 acquires data that is transmitted from the network stack 303 to an external network. The log data acquisition processing unit 402 acquires the data received from the external network from the device driver 304. The log data acquisition processing unit 402 stores the acquired log data in the volatile memory 404.

The log data storage processing unit 403 acquires the log data stored in the volatile memory 404 to store the log data in the nonvolatile memory 405 such as a magnetic recording device. According to the exemplary embodiment, the RAM 202 is used as the volatile memory 404. The hard disk 204 is used as the nonvolatile memory 405. The volatile memory 404 temporarily stores log data. A storage area is divided into areas A and B of logical fixed sizes. The nonvolatile memory 405 stores the log data.

Processing 406 indicates storage processing of the log data from the log data acquisition processing unit 402 into the area A of the volatile memory 404. During the processing 406, the application management unit 401 controls the area A of the volatile memory 404 to be exclusive. Processing 407 indicates storage processing of the log data from the log data acquisition processing unit 402 into the area B of the volatile memory 404. During the processing 407, the application management unit 401 controls the area B of the volatile memory 404 to be exclusive.

Processing 408 indicates acquisition processing of the log data from the area A of the volatile memory 404 into the log data storage processing unit 403. During the processing 408, the application management unit 401 controls the area A of the volatile memory 404 to be exclusive. Processing 409 indicates acquisition processing of the log data from the area B of the volatile memory 404 into the log data storage processing unit 403. During the processing 409, the application management unit 401 controls the area B of the volatile memory 404 to be exclusive.

Processing 410 performs notification of a task starting state or a processing state, and access area reference or exclusive area reference to the volatile memory between the application management unit 401 and the log data acquisition processing unit 402. Processing 411 performs notification of a task starting state or a processing state, and access area reference or exclusive area reference to the volatile memory between the application management unit 401 and the log data storage processing unit 403.

Depending on these processing contents, the log data is stored in one of the areas A and B of the volatile memory. While the log data acquisition processing unit 402 stores the log data in the area A, the log data storage processing unit 403 acquires data of the area B of the volatile memory 404 to store it in the nonvolatile memory 405. Conversely, while the log data acquisition processing unit 402 stores the log data in the area B, the log data storage processing unit 403 acquires data of the area A of the volatile memory 404 to store it in the nonvolatile memory 405.

Access switching between the areas A and B by the log data acquisition processing unit 402 and the log data storage processing unit 403 is carried out by using pieces of information about access areas and exclusive areas managed by the application management unit 401. Access to the nonvolatile memory 404 by the log data acquisition processing unit 402 is carried out during log data acquisition.

Access to the volatile memory 404 by the log data storage processing unit 403 is carried out when a log data stored size managed by the application management unit 401 reaches a threshold value for starting storage in the nonvolatile memory 405. This means that at a point of time when log data of certain sizes are stored in the areas A and B of the logical fixed sizes, storage in the nonvolatile memory 405 is carried out. Even if logical maximum stored sizes of the areas A and B are not reached, storage in the nonvolatile memory 405 is carried out at the point of time when this threshold value is reached. The exemplary embodiment, as it is featured, dynamically changes the threshold value, which enables realization of efficient log data storage. A method for calculating the threshold value will be described below.

Figure 5:
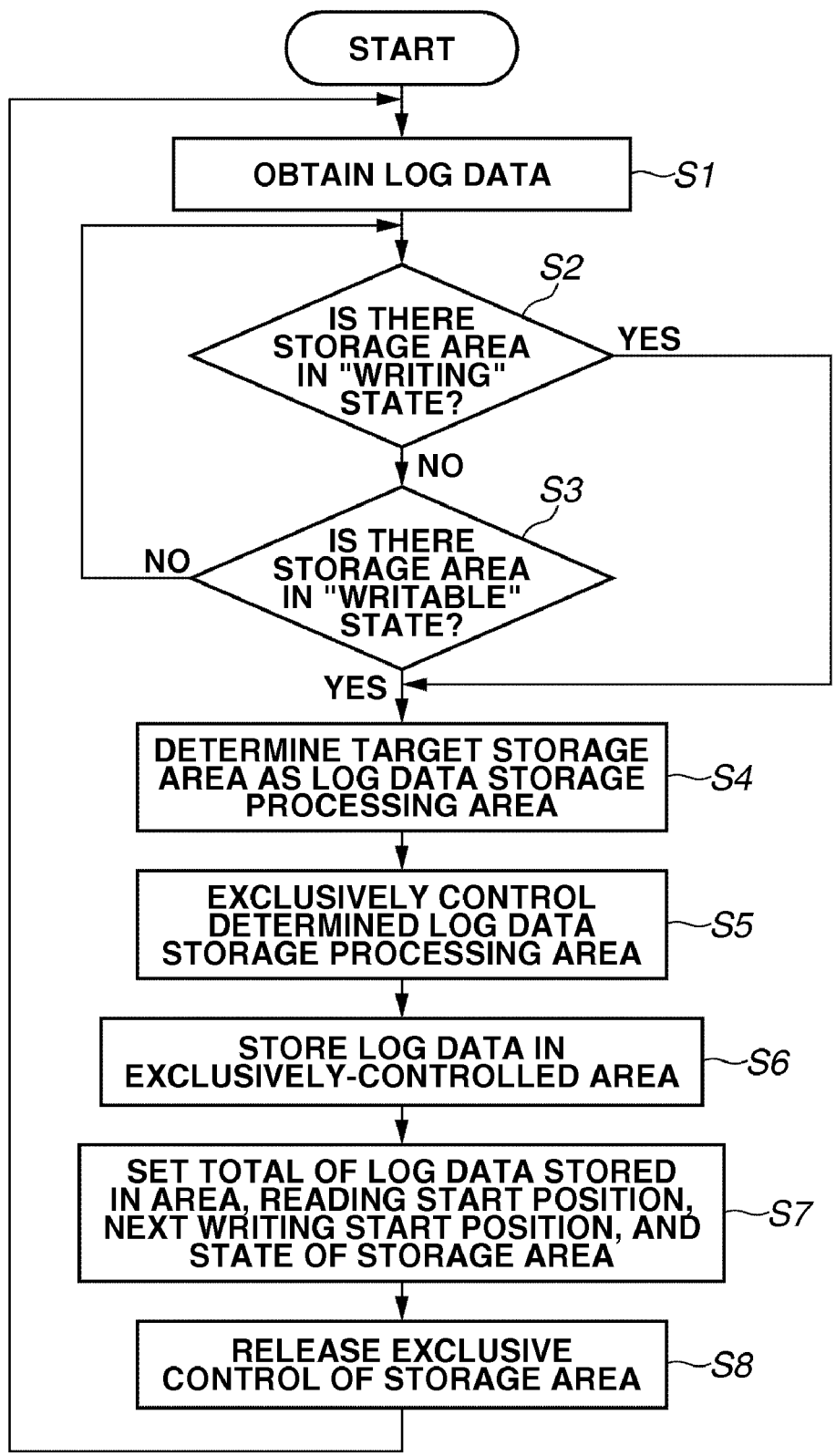
FIG. 5 is a flowchart illustrating a log data acquisition processing carried out by a log data acquisition unit in a normal state.

FIG. 5 is a flowchart illustrating a log data acquisition processing carried out by the log data acquisition processing unit 402 in a normal state. First, in step S1, the log data acquisition processing unit 402 acquires transmitted/received log data from the network stack 303 and the device driver 304. In step S2, the log data acquisition processing unit 402 refers to access states of the areas A and B of the volatile memory 404 in an access state table (FIG. 7) to determine whether there is any storage area in a "writing" state. As described below, a state of this storage area is one of three types: "writable", "writing" and "reading".

If there is a storage area in a "writing" state (YES in step S2), in step S4, the log data acquisition processing unit 402 determines this storage target area as a log data storage processing area. Alternatively, if it is determined in step S2 that there is no storage area in a "writing" state, in step S3, the log data acquisition processing unit 402 determines whether there is any storage area in a "writable" state. If there is a storage area in a "writable" state, in step S4, the log data acquisition processing unit 402 determines this storage area as a log data storage processing area. Alternatively, if there is no storage area in a "writable" state, the log data acquisition processing unit 402 delays a task for a predetermined time, and returns again to step S2 to carry out storage area determination processing.

During this period, data received from the network is kept stored in the RAM used by the device driver 304 until the processing of step S1 is executed next time.

In step S5, the log data acquisition processing unit 402 exclusively controls the determined storage area for access from other tasks.

In step S6, the log data acquisition processing unit 402 writes the acquired log data by a writable amount in the exclusively-controlled area. In step S7, the log data acquisition processing unit 402 sets a log data reading start position, a total size of the stored log data, a next writing position, and a state of the storage area in the access state information table (FIG. 7). In this case, the log data acquisition processing unit 402 refers to a storage start size (FIG. 7) of the area in the nonvolatile memory 405 after the writing, and sets a state of the storage area to a "reading" state if a storage size of the writing area exceeds the storage start size. Thus, overwriting of the log data stored in this area with new log data can be prevented. On the other hand, if there is a free area for writing in the storage area, the log data acquisition processing unit 402 sets a state of the storage area to a "writing" state. The newly acquired log data is additionally written in the free area in next processing.

In step S8, the log data acquisition processing unit 402 releases exclusive control of the area carried out for the storage processing. Then, the log data acquisition processing unit 402 returns to step S1.

Figure 6:
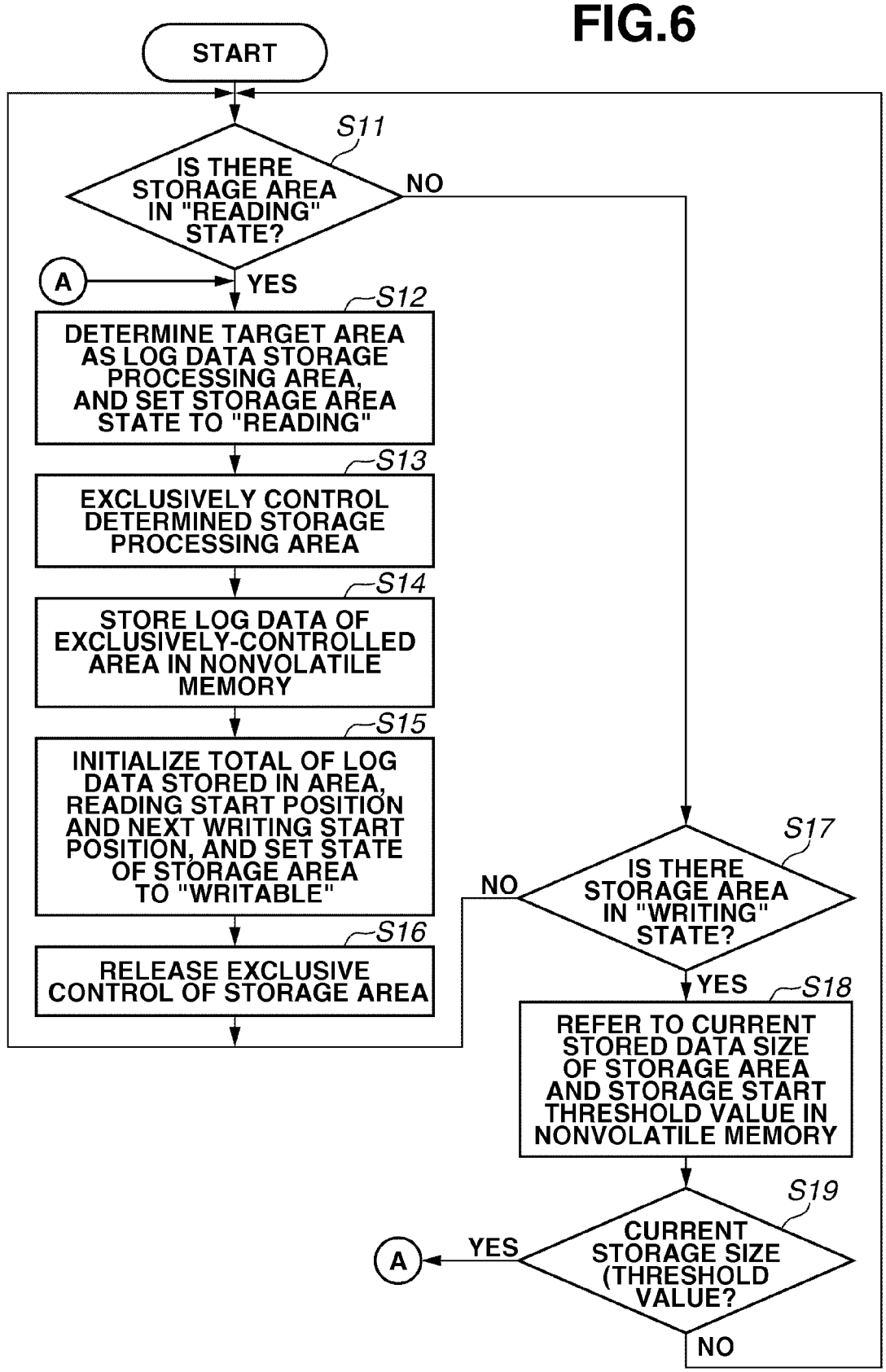
FIG. 6 is a flowchart illustrating log data storage processing in a nonvolatile memory carried out by a log data storage unit in a normal state.

FIG. 6 is a flowchart illustrating log data storage processing in the nonvolatile memory 405 carried out by the log data storage processing unit 403 in a normal state. The application management unit 401 starts this processing in conjunction with the processing carried out by the log data acquisition processing unit 402.

In step S11, the log data storage processing unit 403 refers to access states of the areas A and B of the volatile memory 404 in the access state table (FIG. 7) to determine whether there is any storage area in a "reading" state. If there is a storage area in a "reading" state, in step S12, the log data storage processing unit 403 determines this storage area as a log data storage processing area.

In step S13, the log data storage processing unit 403 exclusively controls access to the determined log data storage area from other tasks. In step S14, the log data storage processing unit 403 may save all log data stored in the exclusively-controlled area in the nonvolatile memory 405 such as a magnetic disk. Alternatively, the log data storage processing unit 403 may save only a part of all log data stored in the exclusively-controlled area of the volatile memory in the nonvolatile memory 405.

After the completion of the storage processing, in step S15, the log data storage processing unit 403 initializes a total of the stored log data, a reading start position, and a next writing start position in the access state information table (FIG. 7) to set a state of the storage area to "writable." Thus, the log data storage processing unit 403 sets this area as a writing area at the time of new log data acquisition. In step S16, the log data storage processing unit 403 releases exclusive control of the area carried out for the storage processing. Then, the log data storage processing unit 403 returns to step S11.

Alternatively, if it is determined in step S11 that there is no storage area in a "reading" state, in step S17, the log data storage processing unit 403 determines whether there is any storage area in a "writing" state. If there is a storage area in a "writing" state, in step S18, the log data storage processing unit 403 refers to a current stored data size of this area set in the access state information table (FIG. 7), and a threshold value of a storage start in the nonvolatile memory.

In step S19, the log data storage processing unit 403 determines whether a currently stored data size has reached a storage start size (threshold value) in the nonvolatile memory. If the currently stored data size has reached the storage start size (threshold value) in the nonvolatile memory, the log data storage processing unit 403 returns to step S12 to determine this area as a log data storage processing area and to set a state of the area to "reading".

On the other hand, if the currently stored data size has not reached the storage start size (threshold value) in the nonvolatile memory, the log data storage processing unit 403 returns to step S11. If it is determined in step S17 that there is no storage area in a "writing" state, the log data storage processing unit 403 returns to step S11.

FIG. 7 illustrates an access state information table regarding the areas A and B in the volatile memory 404. This access state information table is stored in the RAM 202 of the controller unit 200. An item 701 indicates an area logically set in the volatile memory 404. An item 702 indicates an area access state set for each area. Three types of area access states, i.e., "writable", "writing" and "read", can be set.

The "writable" state indicates a state where a current storage data size of the area may be 0 byte, and access is permitted in log data acquisition processing while access is inhibited in log data storage processing. The "writing" state indicates a state where a currently stored data size of the area may be equal to or less than 1 byte and equal to or less than a maximum storage size, and access is permitted in both log data acquisition processing and log data storage processing. The "read" state indicates a state where a currently stored data size of the area may be equal to a maximum storage size of the area, and access is inhibited in log data acquisition processing while access is permitted in log data storage processing.

Item 703 indicates a size of currently stored log data. When the access state of the area is "read", this size may be a maximum storage size. Item 704 indicates a reading start address of log data read by the log data storage processing unit 403. This address is initialized after completion of the log data storage processing. Item 705 indicates a writing start address of log data written by the log data acquisition processing unit 402. This address may be updated for each writing of log data, and initialized after completion of the log data storage processing.

Item 706 indicates a threshold value which is a storage start size of log data in the nonvolatile memory. This information is useable only when the access state of the area is "writing". When the access state is "writing", this area has a free space to enable additional storage of new data, and access is accordingly permitted from the log data acquisition processing unit 402. However, when no storage processing is carried out in the nonvolatile memory until a size of log data stored in the area reaches a maximum storage size, stored data is lost at the time of power cutoff. Thus, if a storage start size (threshold value) in the nonvolatile memory is set, and a currently stored log data size 703 reaches this storage start size 706, the log data storage processing unit 403 may store all stored data in the nonvolatile memory 405. By dynamically changing the size which is a threshold value under predetermined conditions, which may result in efficient log data storage.

Figure 8:
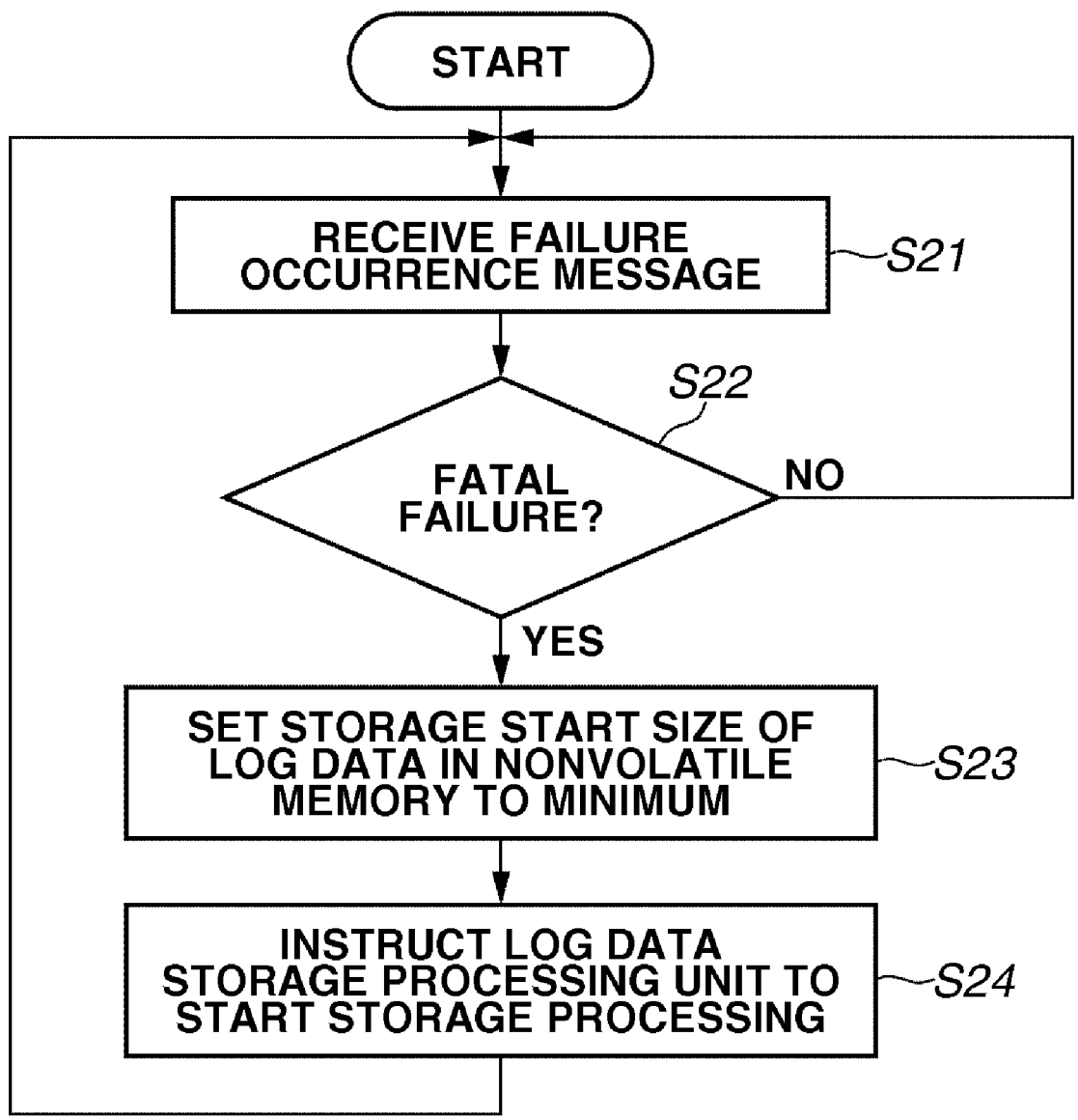
FIG. 8 is a flowchart illustrating a processing procedure of an application management unit during failure detection of the image forming apparatus.

A dynamic changing condition of the storage start size (threshold value) of the log data in the nonvolatile memory and its operation will be described below. FIG. 8 is a flowchart illustrating processing of the application management unit 401 when a failure of the image forming apparatus is detected. The application management unit 401 is started as one task by turning ON the image forming apparatus, and resident to manage operation states of the log data acquisition processing unit 402 and the log data storage processing unit 403, or to transmit or receive messages to/from other tasks. When receiving a log data acquisition start/end notification from another task by, for example, user's operation or a timer function, the application management unit 401 starts the log data acquisition processing unit 402 and the log data storage processing unit 403 to instruct an operation start/end.

In step S21, the application management unit 401 receives a failure occurrence message from another task. In step S22, the application management unit 401 determines whether the failure of the received message is a fatal one that accompanies power OFF/ON.

Specific examples of fatal failures may be occurrence of print jamming, destruction of printer counter information, tampering detection, occurrence of a communication failure in a scanner or a printer, and occurrence of exception processing of each application. An unclear failure is determined as a fatal failure. If a failure that has occurred is fatal, it is highly possible that the apparatus does not recover from the failure unless the image forming apparatus is turned OFF, and a possibility of power cutoff is very high.

In step S23, to prevent a loss of the log data stored in the volatile memory 404 and to store log data thereafter as much as possible in the nonvolatile memory 405, the application management unit 401 sets a storage start size 706 in the nonvolatile memory to minimum. The minimum size described here is a minimum value of log data such as a size of one packet in the case of a network packet. A log data stored size set to the minimum size is set to a default size by a restart operation of power ON/OFF at the time of starting the application management unit 401.

In step S24, the application management unit 401 instructs the log data storage processing unit 403 to store log data. After this instruction, to store data in the nonvolatile memory 405, the log data storage processing unit 403 refers to the storage start size (threshold value) 706 of the nonvolatile memory set in step S23 to immediately store the obtained log data in the nonvolatile memory 405. Then, the application management unit 401 returns to step S21 to carry out normal processing. Alternatively, if it is determined in step S22 that the failure is not fatal, the application management unit 401 returns to step S21 to carry out normal processing.

Figure 9:
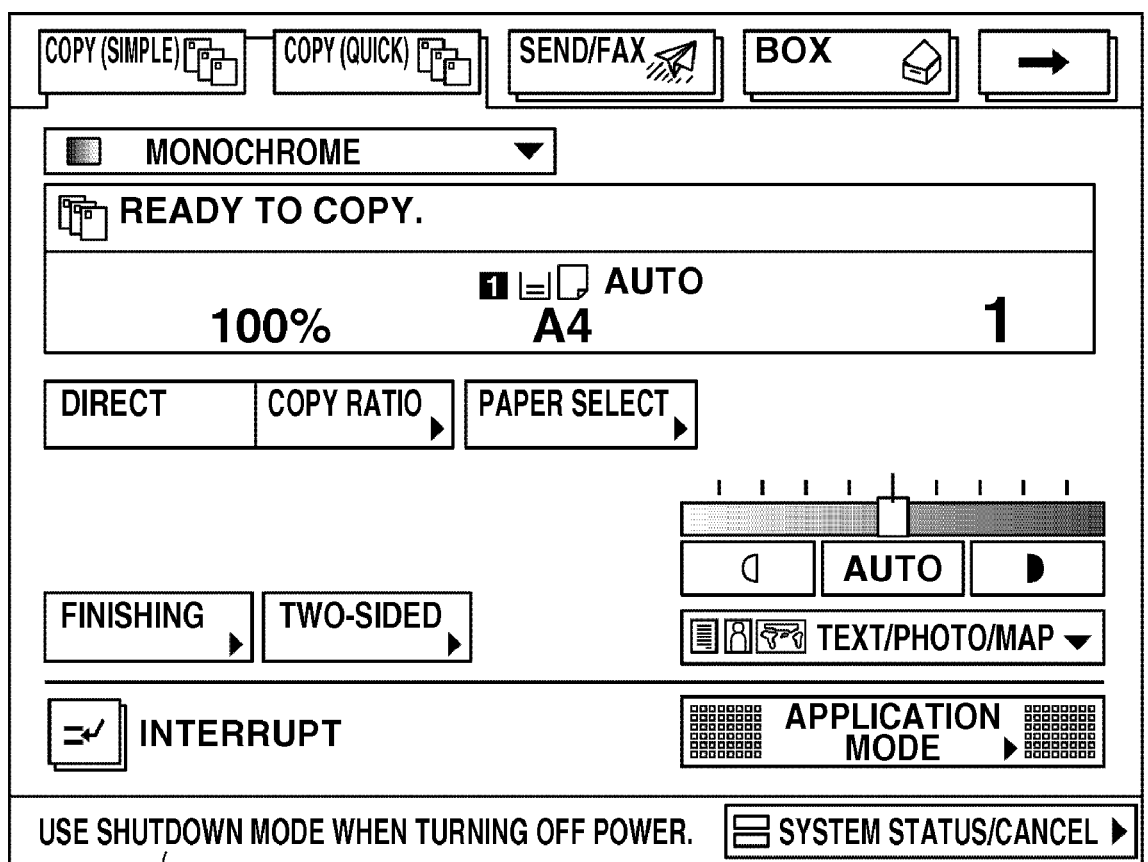
FIG. 9 illustrates a display screen of an operation unit when a storage start size (threshold value) of log data in the nonvolatile memory is smaller than that of a default.

Display contents of the operation unit 212 during dynamic changing of the storage start size (threshold value) 706 of the log data in the nonvolatile memory will be described below. The display contents are similar to other exemplary embodiments described below. FIG. 9 illustrates a display screen of the operation unit 212 when the storage start size (threshold value) 706 of the log data in the nonvolatile memory is set to a size smaller than that of a default. On this display screen, to prevent a user from manually forcing turning-OFF of a power switch, a display 501 is carried out to attract attention. In other words, the display 501 of the operation unit 212 urges the user to perform normal power turn-OFF in a shutdown mode while the threshold value which is a storage start size in the nonvolatile memory is changed. This display 501 is maintained as long as the storage start size (threshold value) 706 of the log data in the nonvolatile memory is set to a size smaller than that of the default. Thus, when the storage start size (threshold value) 706 of the log data in the nonvolatile memory is set small, it is highly possible that power cutoff occurs in the image forming apparatus, so the above display is carried out to prevent a loss of the log data stored in the volatile memory.

According to the first exemplary embodiment, the image forming apparatus acquires and stores the log data in the volatile memory. In the volatile memory, the storage start size is set beforehand as a threshold value in the nonvolatile memory such as a magnetic disk. The recorded data is stored in the nonvolatile memory when it reaches this threshold value. The threshold value is reset by using a predetermined condition as a trigger, and the threshold value which is a storage start size of the log data in the nonvolatile memory is set to a minimum value when restart of the image forming apparatus becomes necessary due to occurrence of a failure.

Thus, by dynamically changing the threshold value of the storage start of the log data in the nonvolatile memory, the log data can be efficiently saved in the nonvolatile memory at the time of power cutoff. As a result, data important for failure analysis, such as log data before or after a device problem or a performance reduction occurs, can be stored.

Further, the log data storage can be efficiently saved while suppressing a performance reduction or deterioration of the nonvolatile memory caused by frequent access to the nonvolatile memory. Moreover, by efficiently storing the log data from the volatile memory into the nonvolatile memory, a log data storage function may be realized at low costs without using any auxiliary battery or charge memory. An auxiliary battery or charge memory may also be applied to the first exemplary embodiment as necessary.

A second exemplary embodiment of the present invention is directed to a condition (condition 2) and an operation different from those of the first exemplary embodiment when the storage start size (threshold value) of the log data in the nonvolatile memory is dynamically changed. A configuration of an image forming apparatus of the second exemplary embodiment is similar to that of the first exemplary embodiment, and thus similar reference numerals are used to omit description thereof.

Figure 10:
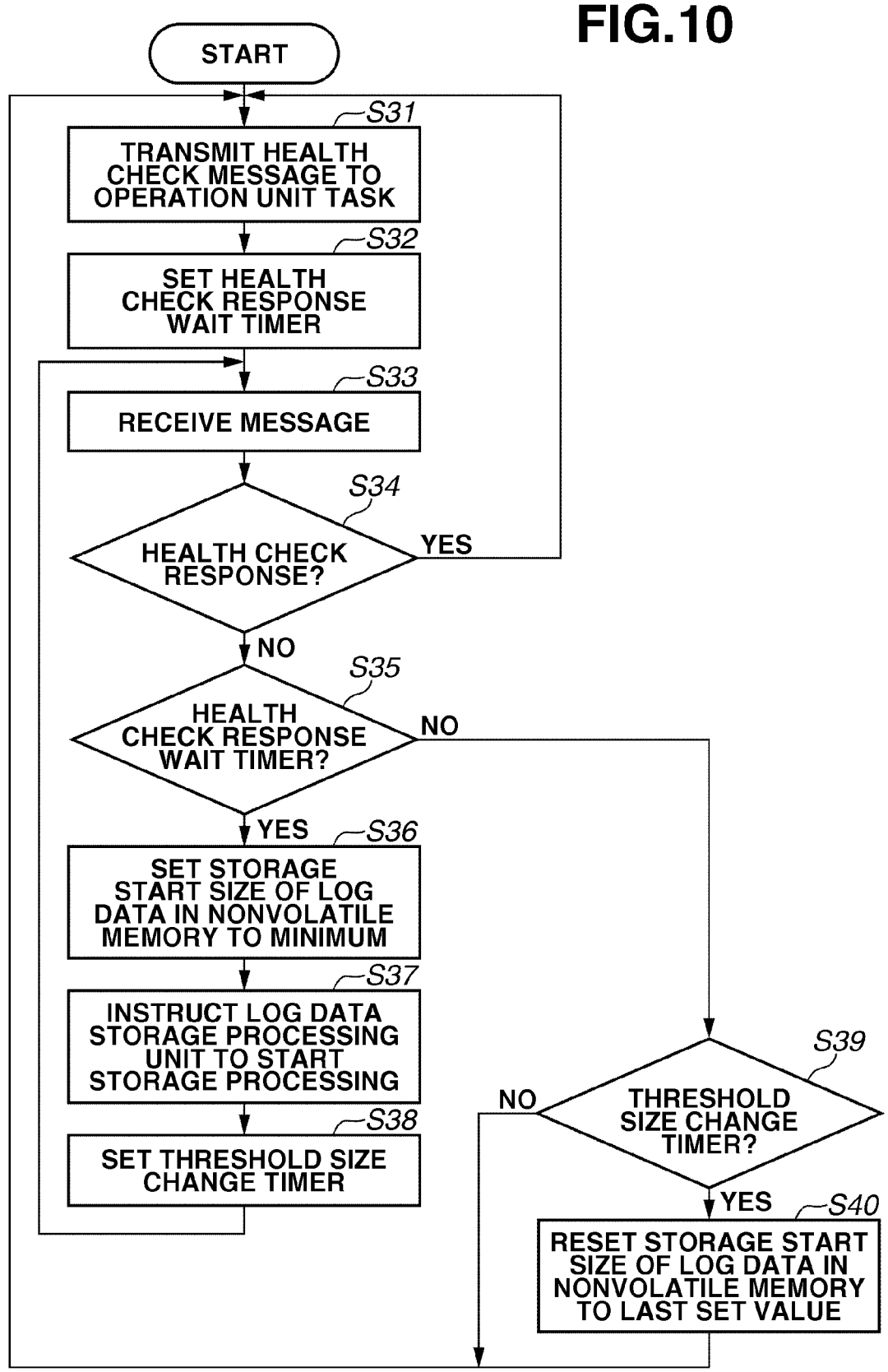
FIG. 10 is a flowchart illustrating a processing procedure of an application management unit according to a second exemplary embodiment of the present invention.

FIG. 10 is a flowchart illustrating processing of an application management unit 401 according to the second exemplary embodiment. In this processing, the application management unit 401 changes setting when it detects a failure of a control task or a performance reduction of an operation unit 212 of the image forming apparatus.

In step S31, the application management unit 401 periodically transmits health check messages to the control task of the operation unit 212. In step S32, the application management unit 401 sets a response wait timer for the transmitted health check messages. In step S33, the application management unit 401 receives a message from another task.

In step S34, the application management unit 401 determines whether the message received from another task is a health check message from the control task of the operation unit 212. If the message is a health check response, the control task of the operation unit 212 normally operates. Thus, the application management unit 401 returns to step S31 to transmit a health check at a next fixed time.

Alternatively, if the message is not a health check message, in step S35, the application management unit 401 determines whether the received message is a notification from a health check message response wait timer. If the message is a notification from the health check message response wait timer, the application management unit 401 determines that a failure of a response in the control task of the operation unit 212 or a performance reduction has occurred. As its reason, shutdown of the control task of the operation unit 212 which is a health check request target due to a failure or freeze of processing due to locking can be adduced, or a health check response may not be returned due to an increase in loads on the task.

As a result, possibility of a power cutoff due to failures or by a user becomes high. In step S36, to store subsequent log data as much as possible in a nonvolatile memory 405 for the purpose of preventing a loss of log data stored in a volatile memory 404, the application management unit 401 sets a storage start size 706 in the nonvolatile memory to a minimum. A minimum size described here may be a minimum value of log data such as a size of one packet in the case of a network packet.

In step S37, the application management unit 401 instructs a log data storage processing unit 403 to store log data. Upon receiving this instruction, in order to store data in the nonvolatile memory, the log data storage processing unit 403 refers to the storage start size (threshold value) in the nonvolatile memory set in step S36 and immediately stores the acquired log data in the nonvolatile memory 405.

In step S38, to prepare for a case where power cutoff caused by the failure of the apparatus or a user has not occurred for a predetermined period, the application management unit 401 sets a change timer for the storage start size (threshold value) 706 in the nonvolatile memory. Then, the application management unit 401 returns to step S33.

Alternatively, if it is determined in step S35 that the received message is not a notification from a health check message response wait timer, in step S39, the application management unit 401 determines whether the message is a notification of a change timer of the storage start size (threshold value) 706 in the nonvolatile memory.

If the message is a notification of a change timer of the threshold value 706, no power cutoff will occur for a predetermined period after a failure of the control task of the operation unit 212 or a performance reduction occurs. Thus, in step S40, the application management unit 401 resets the storage start size (threshold value) 706 in the nonvolatile memory set to the minimum value in step S36 to the size of the last setting time. Then, the application management unit 401 returns to step S31. Alternatively, if it is determined in step S39 that the message is not a notification from a change timer of the threshold value 706, the application management size 401 returns to step S31. The log data stored size set to the minimum value is set to a default size when a restarting operation is performed by power ON/OFF at the time of starting the application management unit 401.

Thus, in the image forming apparatus of the second exemplary embodiment, the threshold value that is a storage start size of the log data in the nonvolatile memory may be set to a minimum value (size) and kept for a predetermined period when an abnormal operation or a reduction of operability from a user interface is detected. When predetermined time passes after the setting of the threshold value to the minimum value, the threshold value is reset to a value (size) set before the last setting of the threshold value to the minimum value. As a result, the image forming apparatus becomes prepared for an abnormal situation of the operation unit caused by the user where a possibility of power cutoff occurrence is high.

A third exemplary embodiment of the present invention is directed to a condition (condition 3) and an operation different from those of the first and second exemplary embodiments when the storage start size (threshold value) of the log data in the nonvolatile memory is dynamically changed. A configuration of the image forming apparatus of the third embodiment is similar to that of the first exemplary embodiment, and thus similar reference numerals are used to omit its description.

Figure 11:
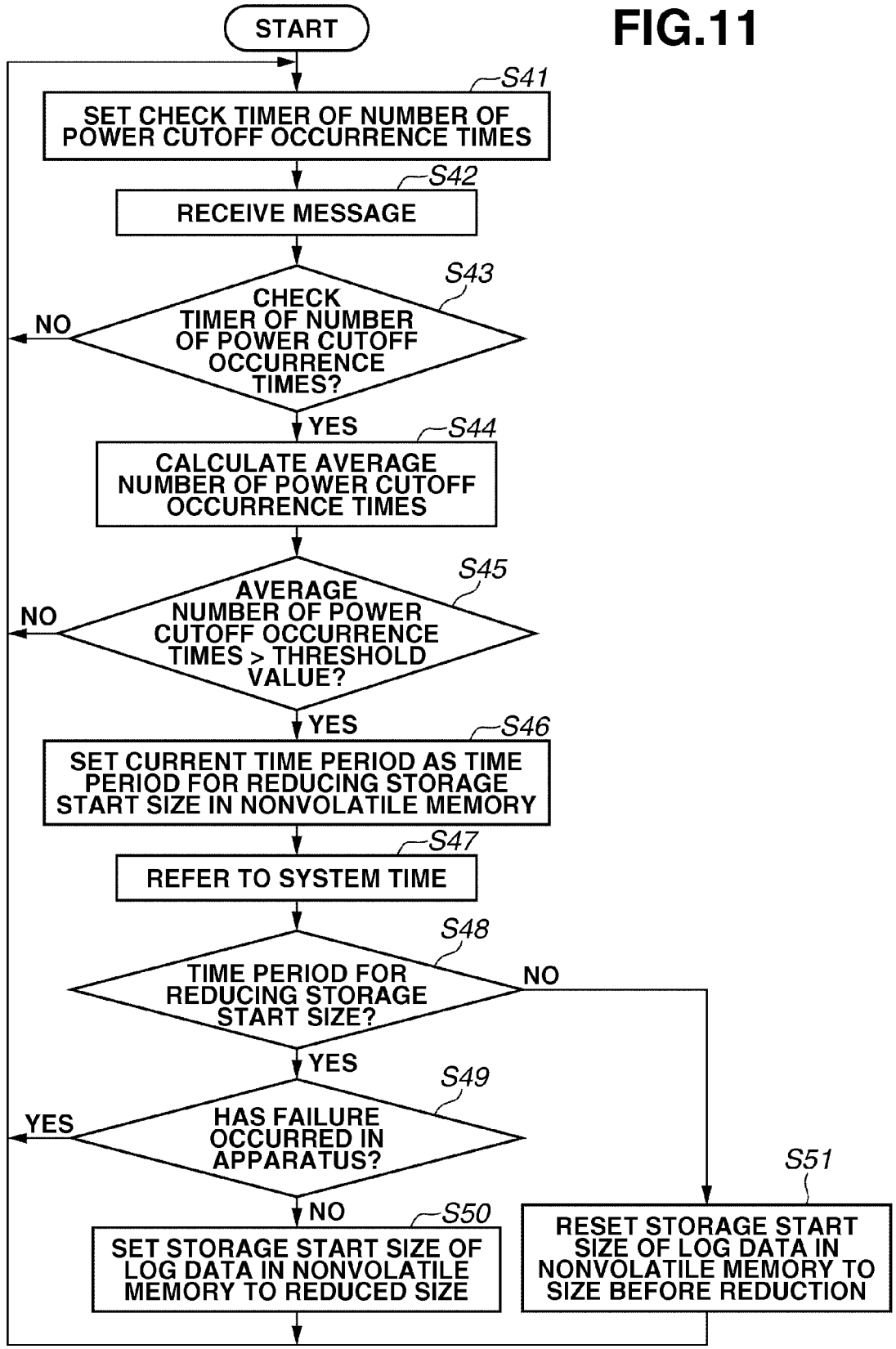
FIG. 11 is a flowchart illustrating a processing procedure of an application management unit according to a third exemplary embodiment of the present invention.

FIG. 11 is a flowchart illustrating processing of an application management unit 401 according to the first exemplary embodiment. In this processing, the application management unit 401 calculates an average number of power cutoff times in a time period based on a total number of power cutoff times and accumulated time (storage time) in each predetermined period, and changes setting if the number of power cutoff times exceeds a predetermined threshold value.

In step S41, to periodically check the number of power cutoff times, the application management unit 401 sets a check timer for the number of power cutoff times. In step S42, the application management unit 401 receives a message from another task. In step S43, the application management unit 401 determines whether the received message is a notification from a check timer for the number of power cutoff times.

If the message is a notification from a check timer for the number of power cutoff times, in step S44, the application management unit 401 calculates an average number of power cutoff times thus far at this time period. This calculation is carried out based on accumulated time thus far and a total number of power cutoff times at the time period. The accumulated time and the total number of power cutoff times are stored in a RAM 202. In step S45, the application management unit 401 determines whether the calculated average number of power cutoff times exceeds a predetermined threshold value. The threshold value is equivalent to the predetermined value described in a claim.

If the average number of power cutoff times exceeds the threshold value, in step S46, the application management unit 401 sets this time period as a time period for reducing a storage start size (threshold value) 706 in a nonvolatile memory.

Figure 12:
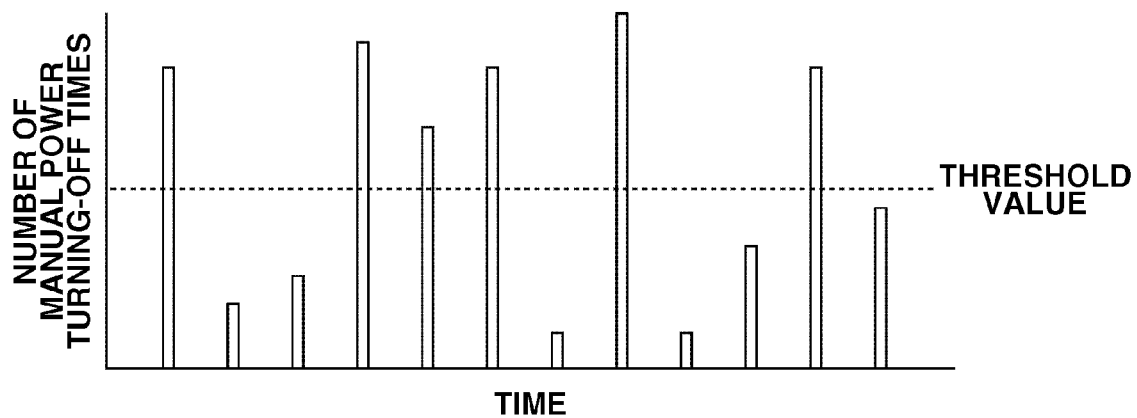
FIGS. 12A and 12B are graphs illustrating the number of power turning-off (OFF) at each time.

FIGS. 12A and 12B are graphs illustrating the numbers of power turning-off (OFF) times at each time. In FIG. 12B, a time period a where the number of power turning-off times exceeds a threshold value is set as a time period for reducing the storage start size (threshold value) 706 in the nonvolatile memory. On the other hand, in FIG. 12A, all time periods are set as time periods for reducing the storage start size.

In step S47, the application management unit 401 acquires system time of the image forming apparatus. In step S48, the application management unit 401 determines whether the acquired current time is a time period for reducing the storage start size (threshold value) 706 in the nonvolatile memory. If the current time is a time period for reduction, in step S49, the application management unit 401 determines whether a failure or a performance reduction has occurred in the image forming apparatus.

If a failure or a performance reduction has occurred in the image forming apparatus, the application management unit 401 returns to step S41. In this case, the storage start size (threshold value) 706 in the nonvolatile memory is set to a minimum size. Thus, the application management unit 401 prevents a loss of log data stored in the volatile memory 404 by keeping this setting.

Alternatively, if neither a failure nor a performance reduction has occurred in the image forming apparatus, a possibility of power cutoff at this time period is high. Thus, the application management unit 401 sets the following. In step S50, the application management unit 401 sets the storage start size (threshold value) 706 in the nonvolatile memory to a reduced size for the purpose of preventing a loss of the log data stored in the volatile memory 404. Then, the application management unit 401 returns to step S41.

Alternatively, if it is determined in step S48 that the time period is not a period for reducing the storage start size, in step S51, the application management unit 401 sets the storage start size (threshold value) 706 in the nonvolatile memory to a size before reduction. Then, the application management unit 401 returns to step S41.

If it is determined in step S45 that the average number of power cutoff times does not exceed the threshold value, or if it is determined in step S43 that the message is not a notification from a check timer of the number of power cutoff times, the application management unit 401 returns to step S41.

Thus, in the image forming apparatus of the third exemplary embodiment, the number of power cutoff times at each time period and accumulated time thus far at each time period are stored for each predetermined time, and the average number of power cutoff times at a time period in which checking is performed is calculated by using these data. If the average number of power cutoff times at the time period in which the checking is performed exceeds a predetermined threshold value, the threshold value that is a storage start size of the log data in the nonvolatile memory at the time period is dynamically changed. As a result, the image forming apparatus becomes prepared for a time period in which a possibility of power cutoff is high.

A fourth exemplary embodiment of the present invention is directed to a condition (condition 4) and an operation different from those when the storage start size (threshold value) of the log data is dynamically changed in the first to third exemplary embodiments. A configuration of an image forming apparatus of the fourth exemplary embodiment is similar to that of the first exemplary embodiment. Thus, similar reference numerals are used to omit description thereof.

Figure 13:
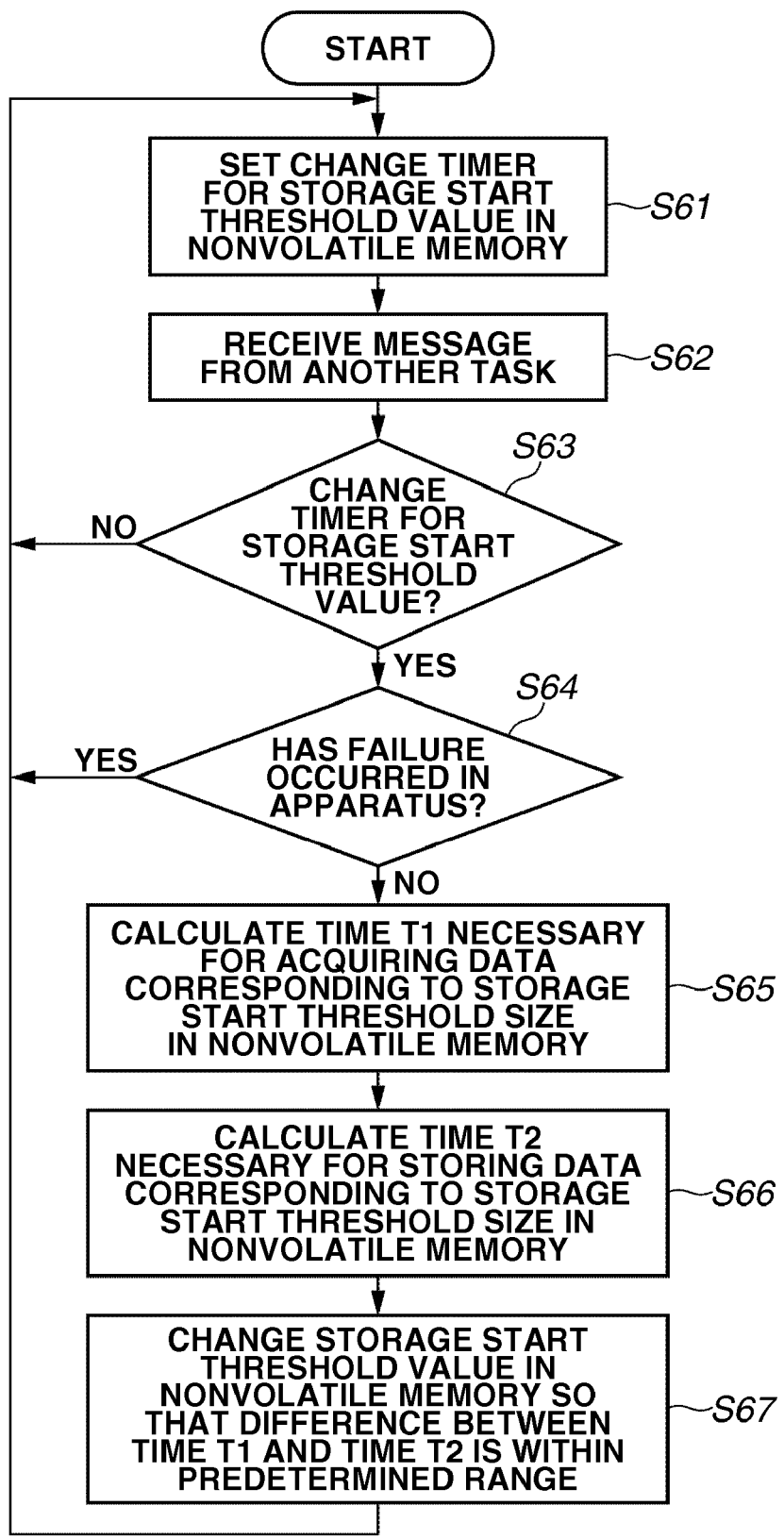
FIG. 13 is a flowchart illustrating a processing procedure of an application management unit according to a fourth exemplary embodiment of the present invention.

FIG. 13 is a flowchart illustrating processing of an application management unit 401 according to the fourth exemplary embodiment. In this processing, the application management unit 401 changes setting when it calculates a storage start size (threshold value) 706 in a nonvolatile memory.

In step S61, to periodically check change of the storage start size (threshold value) 706 of log data in the nonvolatile memory, the application management unit 401 sets a change timer for the storage start size in the nonvolatile memory.

In step S62, the application management unit 401 receives a message from another task. In step S63, the application management unit 401 determines whether the received message is a notification from a change timer for the storage start size (threshold value) in the nonvolatile memory. If the message is a notification from a change timer for the threshold value, in step S64, the application management unit 401 determines whether a failure or a performance reduction has occurred in the image forming apparatus.

If a failure or a performance reduction has occurred in the image forming apparatus, the storage start size (threshold value) 706 in the nonvolatile memory is set to a minimum size. Thus, the application management unit 401 returns to step S61, and keeps this setting to prevent a loss of log data stored in the volatile memory 404.

Alternatively, if neither a failure nor a performance reduction has occurred in the image forming apparatus, in step S65, the application management unit 401 calculates time T1 necessary for acquiring data corresponding to the storage start size (threshold value) 706 in the nonvolatile memory. In step S66, the application management unit 401 calculates time T2 necessary for storing data corresponding to the storage start size (threshold value) 706 in the nonvolatile memory.

The time T1 is calculated as follows. The application management unit 401 starts a fixed-cycle timer at the time of starting acquisition of log data from a device driver 304, and refers to an event occurrence count value of the fixed-cycle timer to calculate data acquisition time when data corresponding to the storage start size in the nonvolatile memory is acquired.

Regarding calculation of the time T2, an average writing speed in the nonvolatile memory for each unit data block is determined by a used nonvolatile memory. Thus, the application management unit 401 multiplies the speed by a multiple of the number of blocks of a written data size to calculate data accumulated time.

In step S67, the application management unit 401 calculates a difference between the time T1 and the time T2, and does not change the storage start size 706 in the nonvolatile memory if a value of the difference is within a predetermined range. The application management unit 401 changes the storage start size 706 if the value is outside the predetermined range. Then, the application management unit 401 returns to step S61.

If it is determined in step S64 that a failure or a performance reduction has occurred in the image forming apparatus, or if it is determined in step S63 that the message is not a notification from a change timer of the threshold value, the application management unit 401 returns to step S61.

Processing becomes more efficient as the difference between the time T1 and the time T2 is closer to a value of 0. However, a value of the time T1 greatly fluctuates depending on timing. Thus, a permissible range around the value 0 is prepared and, if the time difference value is within the range, the application management unit 401 does not change the storage start size 706 in the nonvolatile memory.

Thus, the time T1 needed by the log data acquisition processing to reach the storage start size in the nonvolatile memory is calculated, and the time T2 needed until completion of writing the log data corresponding to the storage start size in the nonvolatile memory is calculated. To set the difference between the calculated time T1 and time T2 to a value within the predetermined range, the threshold value that is a storage start size in the nonvolatile memory is dynamically changed. Thus, acquisition and storage of the log data can be carried out with good balance.

In each of the exemplary embodiments, the threshold value that is a storage start size in the nonvolatile memory is set to the minimum size (e.g., size of one packet). However, the size is not limited to the minimum size. The size may be set to a larger optional reduced size.

With respect to the conditions 1 to 4 of the first to fourth exemplary embodiments, when the storage start size (threshold value) 706 in the nonvolatile memory is changed, the size is set to the same threshold value. However, the size may be changed to a different threshold value according to a condition. FIG. 14 illustrates a status where the storage start size (threshold value) in the nonvolatile memory is set to a different value according to a condition. For example, normally, in the condition 1, a most reduced size is set as a threshold value with respect to a maximum size stored in the volatile memory. In the other conditions 2 to 4, a size larger than the size of the condition 1 is set as a threshold value. This is because of an extremely high possibility of power cutoff when a failure occurs in the image forming apparatus. Thus, a phenomenon or a time period where a possibility of power cutoff occurrence is high may be predicted, and a storage start size (threshold value) in the nonvolatile memory may accordingly be set to a different value. As a result, an operation status of the image forming apparatus, log data can be saved according to a phenomenon or a time period where a possibility of power cutoff occurrence is high.

In the exemplary embodiment, the RAM is used as a volatile memory, and the hard disk is used as a nonvolatile memory. However, other storage media may be used. For example, a magneto-optical disk or a semiconductor memory, may be used as a nonvolatile memory.

The image forming apparatus may be a system which includes a plurality of devices, or an apparatus which includes one device.

One exemplary embodiment of the image forming apparatus is a multifunction peripheral. However, other image forming apparatus such as a printer, a copying machine, a facsimile device, a personal computer, or a portable telephone may also be employed.

The present invention is achieved by executing the following processing. A storage medium recording a program code of software to realize the functions of the exemplary embodiments is supplied to the system or the apparatus, and a computer (or CPU or MUP) of the system or the apparatus reads the program code stored in the storage medium.

In this case, the program code read from the storage medium itself realizes the function of the exemplary embodiment, and the program code and the storage medium recording the program code are within the present invention.

As the storage medium for supplying the program code, for example, a floppy disk, a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, or a ROM can be used. The program code may be downloaded via the network.

A case where executing the program code read by the computer realizes the function of the exemplary embodiment is within the present invention. In addition, a case where the OS running on the computer executes a part or all parts of actual processing based on an instruction of the program code, and the processing realizes the function of the exemplary embodiment is within the present invention.

The function of the exemplary embodiment by the following process is within the present invention. The program code read from the storage medium is written in a memory provided in a function extension board inserted into the computer or a function extension unit connected to the computer. Then, based on the instruction of the program code, a CPU provided in the function extension board or the function extension unit executes a part or all parts of actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2008-069968 filed Mar. 18, 2008, which is hereby incorporated by reference herein in its entirety.

What is claimed is:

1. An image forming apparatus comprising:
an acquisition unit configured to acquire log data recording operation of the image forming apparatus;
a first storage device configured to store the acquired log data in a volatile memory;
a calculation unit configured to calculate a total size of the log data stored in the volatile memory;
a determination unit configured to determine whether the calculated total size of the log data has reached a threshold value;
a second storage device configured to store the log data from the first storage unit when the total size of the log data has reached the threshold value, the second storage device configured to store the log data from the first storage device in a nonvolatile memory;
a changing unit configured to change the threshold value according to an operation state of the image forming apparatus;
a first time calculation unit configured to calculate first time until the total size of the log data stored in the volatile memory reaches the threshold value; and
a second time calculation unit configured to calculate second time until storage of all the log data stored in the volatile memory is transferred to the nonvolatile memory of the second storage device,
wherein the changing unit changes the threshold value to set a difference between the first time and the second time to a value within a predetermined range.

2. The image forming apparatus according to claim 1, further comprising a network communication function,
wherein the acquisition unit acquires log data recording communication contents as operation contents of the image forming apparatus.

3. The image forming apparatus according to claim 2, wherein the acquisition unit acquires a packet transmitted/received by the network function as the log data.

4. The image forming apparatus according to claim 1, further comprising:
a detection unit configured to detect occurrence of a failure in the image forming apparatus; and a determination unit configured to determine whether a content of the failure which has occurred requires restarting of the image forming apparatus, wherein the changing unit changes, if the failure content requires restarting of the image forming apparatus, the threshold value to a reduced value.

5. The image forming apparatus according to claim 1, further comprising:

an operation unit configured to operate the image forming apparatus through a user; and a detection unit configured to detect an abnormality of the operation unit, wherein the changing unit changes, when the abnormality of the operation unit is detected, the threshold value to a reduced value, and returns the threshold value to a value before the change, after predetermined time has passed.

6. The image forming apparatus according to claim 1, further comprising:

a third storage device configured to store a number of power cutoff times and accumulated time at each time period; and a number-of-times calculation unit configured to calculate, based on the number of power cutoff times and the accumulated time which have been stored, an average number of power cutoff times at the time period, wherein the changing unit changes, if the calculated average number of power cutoff times exceeds a predetermined value, the threshold value of the time period to a reduced value.

7. The image forming apparatus according to claim 1, further comprising a display unit configured to display, if the changing unit is in the middle of changing the threshold value, the ongoing changing.

8. The image forming apparatus according to claim 1, wherein the changing unit sets the threshold value to a different value, according to an operation state of the image forming apparatus.

9. The image forming apparatus according to claim 1, wherein the volatile memory comprises at least a first area and a second area, and while the acquired log data stored in the first area is saved in the nonvolatile memory of the second storage device, the second area stores additional log data acquired by the acquisition unit.

10. The image forming apparatus according to claim 1, wherein the nonvolatile memory is a hard disk, a magneto-optical memory, or a semiconductor memory.

11. A method for recording operation contents of an image forming apparatus, comprising:

acquiring log data recording the operation of the image forming apparatus;

storing the acquired log data in a volatile memory;

calculating a total size of the log data stored in the volatile memory;

determining whether the calculated total size of the log data has reached a threshold value;

storing the log data from the volatile memory in a nonvolatile memory when the total size of the log data has reached the threshold value;

changing the threshold value according to an operation state of the image forming apparatus;

calculating first time until the total size of the log data stored in the volatile memory reaches the threshold value; and calculating second time until storage of all the log data stored in the volatile memory is transferred to the nonvolatile memory, wherein changing the threshold value to set a difference between the first time and the second time to a value within a predetermined range.

12. A non-transitory computer-readable storage medium storing a computer program for causing a computer to execute a method for recording operation contents of an image forming apparatus, the method including:

acquiring log data recording the operation of the image forming apparatus;

storing the acquired log data in a volatile memory;

calculating a total size of the log data stored in the volatile memory;

determining whether the calculated total size of the log data has reached a threshold value;

storing the log data from the volatile memory in a nonvolatile memory when the total size of the log data has reached the threshold value;

changing the threshold value according to an operation state of the image forming apparatus;

calculating first time until the total size of the log data stored in the volatile memory reaches the threshold value; and calculating second time until storage of all the log data stored in the volatile memory is transferred to the nonvolatile memory, wherein changing the threshold value to set a difference between the first time and the second time to a value within a predetermined range.

* * * * *